June 6, 1967  R. E. LACEY ETAL  3,323,653
MULTIMEMBRANE APPARATUS FOR DEMINERALIZING LIQUIDS
Filed March 20, 1963  2 Sheets-Sheet 2
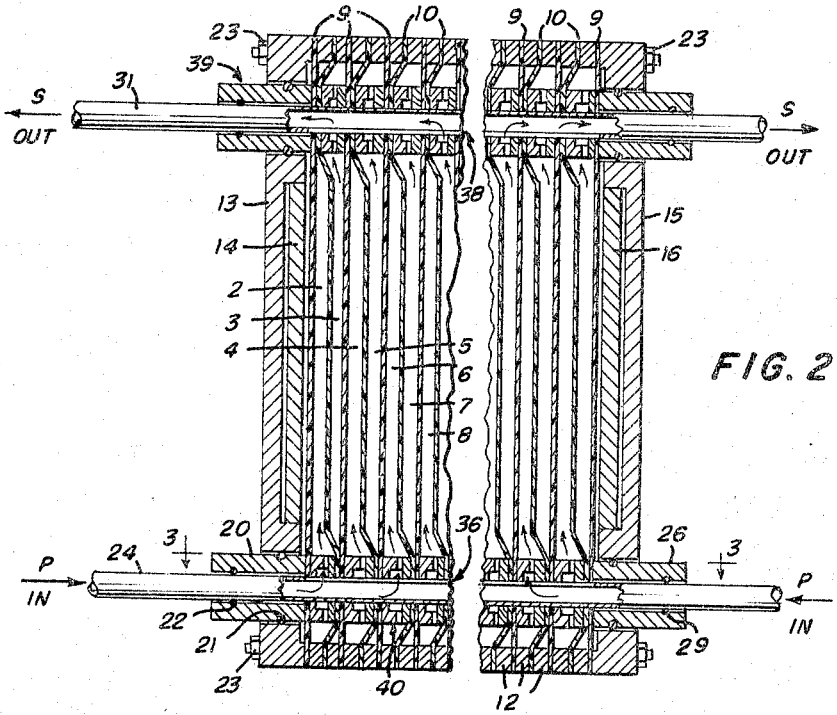
FIG. 2
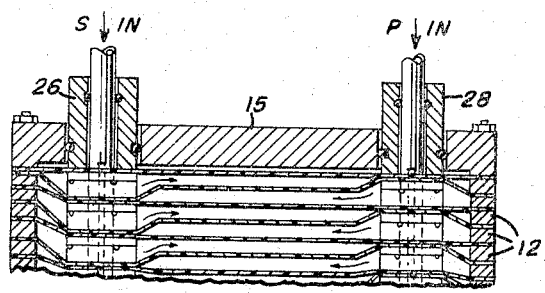
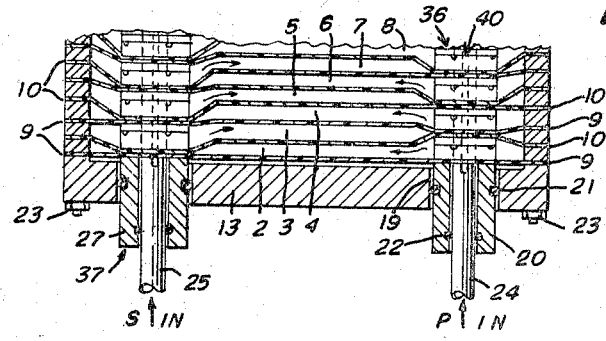
FIG. 3
INVENTORS
ROBERT E. LACEY
NORMAN L. FRANCIS
BY
ATTORNEYS

United States Patent Office 3,323,653
Patented June 6, 1967

3,323,653
MULTIMEMBRANE APPARATUS FOR
DEMINERALIZING LIQUIDS
Robert E. Lacey, Homewood, and Norman L. Francis, Birmingham, Ala., assignors to the United States of America as represented by the Secretary of the Interior
Filed Mar. 20, 1963, Ser. No. 266,768
4 Claims. (Cl. 210—321)

The invention herein described and claimed may be manufactured and used by or for the Government of the United States of America for governmental purposes without the payment of royalties thereon or therefor.

This invention relates to improvements in a liquid purification unit having particular utility in electrochemical processes for the demineralization of liquids. One form of this improved unit comprises a multiplicity of thin-walled, narrow envelope-like cells, or compartments in which flow liquid solutions channeled thereto through specially shaped inlet and outlet elements arranged and maintained in the unit so they also function as spacers and clamps among the walls of the compartments. The unit according to the invention can be beneficially applied to carry out either electrodialysis or osmionic demineralization treatments of liquid solutions. As disclosed in U.S. Patent No. 2,758,083, issued Aug. 7, 1956, to Van Hoek et al., electrodialysis employs an external electromotive force applied in series across ion-selective membranes forming separate compartments through which the appertaining solutions flow. Dissolved solids are removed from solution by forcing such solids through the membranes of the compartments in which the solution is being purified into adjacent compartments in which a solution is being enriched. Osmionic demineralization of solutions involves essentially the same procedure with the exception that an external electromotive force is not required. Instead use is made of the difference in concentrations between two solutions as a source of energy to remove the solids from the solution being purified. For a detailed disclosure of this phenomenon attention is directed to U.S. Patent No. 2,947,688, issued on Aug. 2, 1960, to G. W. Murphy.

Economical utilization of electrodialysis apparatus requires that the electrical energy expended for the demineralization of its electrolyte solutions be decreased. However, placing a direct current voltage across the cells or compartments of such an apparatus passes the voltage through the membrane walls thereof which are in contact with electrolyte solutions. This gives rise to polarization effects at the surface of these membranes, making likely the need for increased electrical energy. Accompanying polarization are changes in the pH of the electrolyte solution with resultant damage to the membranes, as well as a decrease in the concentration of the electrolytes in the liquid adjoining the membrane surfaces which lowers the allowable current densities applicable for the electrodialysis. Polarization occurs because the current coming to a membrane-solution interface is limited by the rate at which ions can diffuse from the bulk of the solution to the interface. Consequently, a most significant factor in controlling polarization is achieving an appropriate flow velocity for the electrolyte solution passing through the compartments formed by the membrane walls. Obstructed or decreased flow of solution in one compartment of a unit brings about polarization in that compartment at current densities that do not affect the other compartments of the unit in which a predetermined normal flow is maintained. It is evident therefore, that the lower the flow velocity of a solution passing through a compartment the lower the permissible current density. Moreover, if one compartment out of as many as several hundred compartments in a unit has a lower flow rate than any of the other compartments, that one compartment limits the allowable current density and sets the over-all demineralization rate to a value lower than would be the case if all compartments were receiving their flow of electrolyte solutions at the predetermined normal rate.

Maintenance of a suitable uniform flow rate for the electrolyte solutions in the respective compartments is contingent principally upon an effective control of the hydraulic resistance to their flow. Because of the unpredictable dimensional changes of the non-selective membranes, it is almost impossible to form the solution compartments so that the hydraulic resistance of each compartment is made the same as that for any other compartment. Moreover, this difficulty is often intensified since many of the generally available membranes have a tendency to cold-flow or creep under the influence of unbalanced hydraulic pressures. By means of the present invention the hydraulic resistance in the compartmented structures of a unit is made a minor and insignificant part of the total hydraulic resistance to the flow of the electrolyte solutions such that dimensional changes in the membranes do not have any substantial effect upon the flow rate of the solutions in the compartments. For this purpose most of the total resistance to solution flow is engendered in a unique solution distributing structure intimately associated with the structure and form of the compartment's membrane walls. Individual parts of this distributing structure can be mass produced by known techniques with excellent quality control whereby the hydraulic resistance offered by any solution distributing element of the structure would be the same as that offered by any other such element. Since the indeterminate variations in hydraulic resistance due to the dimensional changes in the membrane walls can thereby be made to affect the total hydraulic resistance to flow only slightly, the attainment of essentially equal uniform rates of solution flow through the individual compartments becomes feasible.

Comprising the solution distributing structure according to the invention are a plurality of tubular conduits, each of which is received through respective conforming openings correspondingly located at spaced points on each of the membrane walls. Separate gaskets clamping these membrane walls about their edges form the solution receiving compartments. Specially formed washer-like elements are threaded upon the conduits so that they are individually positioned between and in contact with the membrane walls. Longitudinal slit openings in the conduits communicate with groove-like channels in the elements to complete a flow path for the solutions from the conduits to the elements and through the compartments. A pair of sleeves flexibly supported on each conduit and individually maintained for adjustment in the end walls of the unit's enclosure structure, are operable to clamp together the aligned elements and membranes arrayed along the separate conduits, to provide a tight seal around each opening in the membranes.

Accordingly, it is an object of the present invention to provide means to maintain a substantially uniform hydraulic resistance to the flow of electrolyte solutions through the compartmented cells of an electrodialysis or osmionic liquid purification unit.

Another object of the invention is to provide a solution distributing means having several parts thereof effectively positioned between the membrane walls of the compartments receiving solutions, to index, and properly align such membrane walls during assembly and operation.

A further object of the invention is to provide solution distributing elements between the membrane walls of solution receiving compartments allowing suitable ingress and egress of solutions through these compartments which are made extremely narrow to facilitate a compact and efficient arrangement in a unit.

A still further object of the invention is to provide solution distributing elements in clamping contact with the membrane walls of compartments receiving solutions therethrough, to effect positive seals between the membranes and the elements whereby leaks between the compartments are avoided.

A yet still further object of the invention is to provide solution distributing elements between the membrane walls of solution receiving compartments to achieve sealing contacts thereat by clamping pressures applicable separately to several arrangements of such elements within a purification unit.

These and other objects and advantages of the invention will be more readily understod from the following detailed description of preferred embodiments of the invention, considered together with the accompanying drawings wherein:

FIG. 2 is a partial sectional view in a vertical plane passing through the longitudinal axis of upper and lower solution transmitting manifolds at the right of the unit as shown in FIG. 1;

FIG. 3 is a further partial sectional view taken in the direction of arrows 3—3 in FIG. 2, in a plane parallel to the longitudinal axis of the two manifolds in the lower part of the unit as shown in FIG. 1;

FIG. 4 is a perspective view of a solution distribution assembly of the unit shown in FIG. 1, whose disks are shown separated to reveal the particular form of their internal surfaces; and FIG. 5 is a partial sectional view in the nature of that shown in FIG. 3, illustrating a modification of a solution feed arrangement for the compartments.

Figure 1:
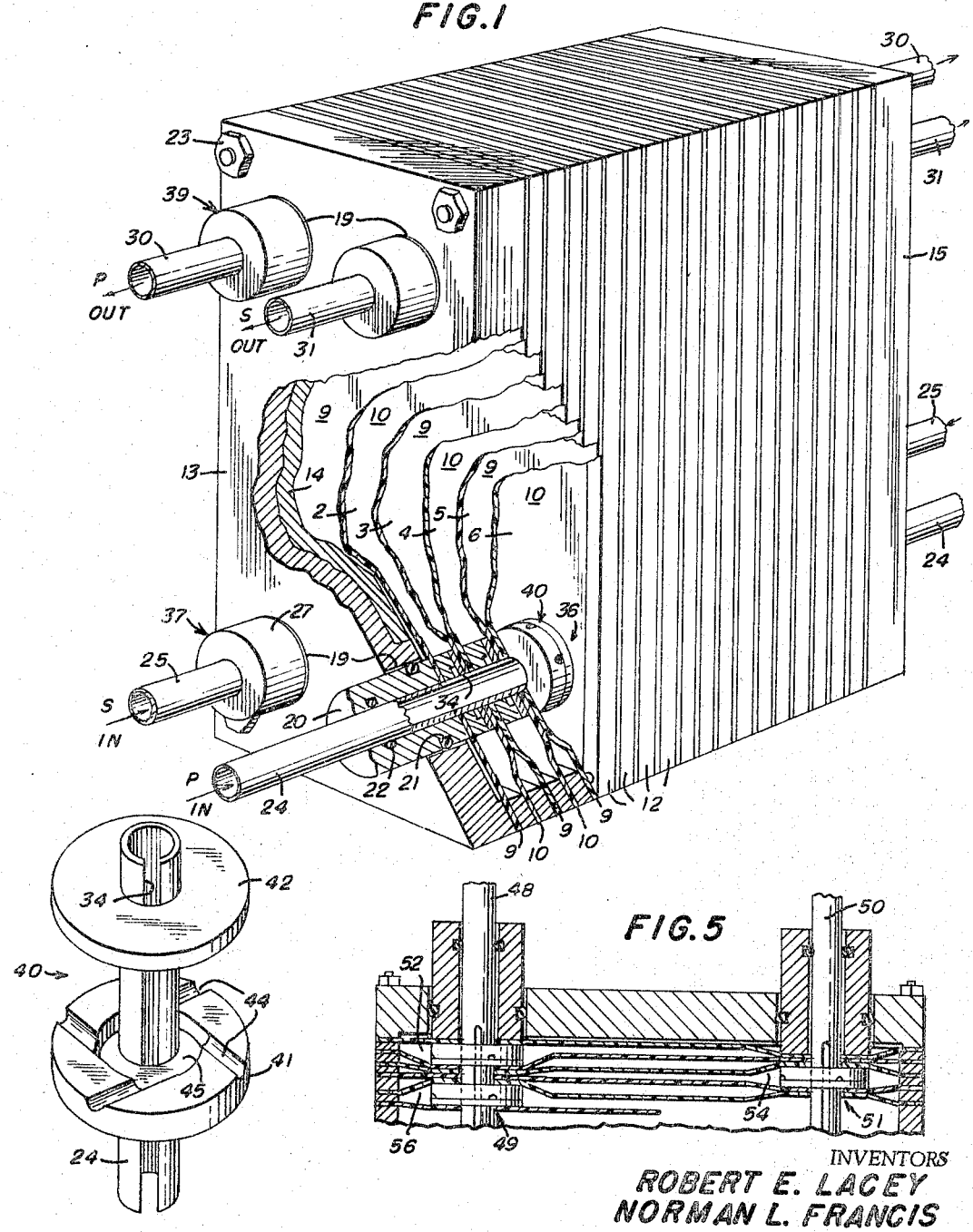
FIG. 1 is a perspective view of an improved electrodialysis unit with partial sections taken therein to reveal portions of its compartments and a solution feed arrangement therefor.

Referring first to FIG. 1, a multi-cell electrodialysis unit for demineralizing saline or brackish waters is shown according to one preferred embodiment of the present invention to comprise a plurality of ion-selective membranes 9 and 10, individually gripped completely about their edges, between relatively narrow enclosing strips comprising rectangular frames 12. The frames with the membranes supported therein, are arrayed in a standing stacked alignment between relative thicker end plates 13 and 15. These plates are tied together by nuts 23 on threaded rods passing through the entire stack whereby the latter is clamped together to fashion the basic configuration of the unit. However, the frames are essentially gaskets sealing the membranes along their edges to define spaces enclosed between the membranes, constituting a multiplicity of narrow envelope-like cells or compartments 2, 3, 4, 5, 6, etc. Shallow depressions on the inside surface of the end plates 13 and 15 receive electrode plates 14 and 16, respectively, which are therein maintained aligned parallel to the compartment formed by the membranes.

Aligned pairs of upper and lower openings 19, through each of the end plates 13 and 15, are spacially arranged thereon to appropriately position a plurality of solutions transmitting devices for cooperation with the multiplicity of compartments. Secured in each of the end plate openings is a sleeve-like coupling which provides a flexible connection between a tubular element constituting a solution transmitting duct or conduit, and the end plate. As disclosed in FIG. 1, by the sectional cut through a coupling sleeve 20 fitted within an opening 19 of the end plate 13, this connection is comprised of an O-ring 21 retained in a narrow track around the outer surface of the coupling.

This coupling structure is effective to seal the end plate opening wherein it resides, as well as to maintain itself in an adjusted position for clamping together solution distributing and indexing assemblies positioned between the membranes 9 and 10, for a purpose more fully explained hereinafter. Two pairs of couplings, maintained in the aligned openings 19 of the end plate 13, act conjointly with coupling members arranged opposite thereto in end plate 15. Each set of opposed couplings support within their central openings one of the several tubular conduits adapted to carry solutions to and from the unit. This arrangement will be best understood by referring to the details of the sectional views of FIGS. 1 and 3, showing tubular conduits 24 and 25 supported in coupling sets 20, 26, and 27, 28, respectively. O-rings used within the respective couplings to seal the passages containing the conduits, also act to suitably maintain the conduits in adjusted position. Conduit 24 for example, is maintained extended between openings 19 in the end plates 13 and 15 by means of O-rings 22 and 29, retained in groove-like tracks within the couplings 20 and 26, respectively. In a similar manner further conduits 25, 30 and 31 are arranged between the end plates in parallel with conduit 24, by means of O-rings fitted in tracks provided within and without their corresponding supporting coupling sets. Suitably located holes provided in each of the multiplicity of membranes 9 and 10, accommodate the conduits 24, 25, 30 and 31, to pass neatly therethrough without distorting or stressing the fabric of the membranes.

Flow of the solutions through the respective compartments of the unit is accomplished when solution is fed thereto from the tubular conduits 24 and 25, and permitted to leave therefrom in the tubular conduits 30 and 31. Facilitating this flow through the compartments are manifold arrangements 36, 37, 38 and 39, having operatively associated therein conduits 24, 25, 31 and 30 respectively. Each manifold comprises a series of substantially identical solution distributing assemblies 40, set up parallel to each other along the tubular conduit associated therewith, whereby each assembly assumes an operative position within a particular one of the membrane compartments. In the wall of each conduit is a straight, narrow slot extending approximately the full length thereof situated between and within the end plates 13 and 15. Provided thereby is a passage completing a path along which solution may flow to or from the conduits in communication with the manifold assemblies and therethrough to pass between the membranes of the compartments.

The flow path for solution passing between any conduit slot and a compartment becomes evident with reference to FIGS. 1 and 4, the latter illustrating the structural details of one of the distributing assemblies 40. As seen in FIG. 4, an assembly 40 is axially supported on the conduit 24, which passes through central openings in the elements of the assembly comprising a channeling disk 41, and a washer disk 42, which encircle the conduit, crossing over an extended solution inlet slot 34 therein. When disks 41 and 42 are together as shown in FIG. 1, they enclose between them a number of narrow grooves 44, and a central concavity or pocket 45 molded into the disk 41. Grooves 44 thereby constitute ducts which join the pocket 45 to provide a plurality of off-centered channels which are in position to direct the flow of solution received in the pocket 45 from the slot 34, to beyond the peripheral edge of the distributing assembly 40. Also evident in this construction is a means into which solution flowing from a compartment will drain and be directed through the grooved channels and annular pocket thereof, into a slot in a conduit carrying solution out of the unit. Moreover, since liquid solution filling an annular pocket 45, is at the same time part of the liquid flow in all the ducts of the assembly, a predetermined alignment between the slot in the conduit and any of the grooves 44 becomes unnecessary to insure unrestricted flow of solution through the liquid transmitting parts. Several forms of the distributing assemblies 40 are further described in the copending application Ser. No. 266,767, filed Mar. 20, 1963, by Everett L. Huffman, and assigned to the assignee of the instant case.

In order to function as required, the apparatus hereinabove described must be arranged to operatively associate every other solution compartment thereof with manifolding structure supplying them with the same solution. For example, even numbered compartments in a series would receive only solution to be diluted or purified (P solution), and the adjacent compartments, the odd-numbered ones, would receive only solution to be concentrated or enriched (S solution). Separate manifolding arrangements are therefore necessary such that one arrangement is provided to interconnect all even-numbered compartments, and another arrangment is provided to interconnect all odd-numbered compartments. Moreover, since the distributing assemblies in the unit of the preferred embodiment can thus each be twice as thick as the thickness of its compartments, the component disks of the assemblies can be made suitably thick to withstand critical pressures and stresses which are likely to be applied to them. Manifolding arrangments 36 and 37, as shown in FIGS. 2 and 3, supply the requisite solutions to the even-numbered, and odd-numbered compartments, respectively. Since the compartments of the unit are formed by alternately arranged cation-permeable membranes 9, and anion-permeable membranes 10, the compartments 2, 4, 6, 8, etc., are operatively associated with manifolding arrangement 36 supplying the diluting or P solution thereto, and the compartments 3, 5, 7, etc., are operatively associated with manifolding arrangement 37 supplying the concentrating or S solution thereto. After the P solution flows between the membranes of the even-numbered compartments, it drains through the distributing assemblies 40 of the manifolding arrangement 39, and leaves the unit in tubular conduit 30. Similarly, after the S solution flows between the membranes of the odd-numbered compartments, it drains through the assemblies 40 of the manifolding arrangement 38, and leaves the unit in tubular conduit 31.

The cross-over or counterflow of the P and S solutions within adjacent compartments of the multiplicity thereof in the unit, is achieved by utlizing the distributing assemblies 40 to uniquely index and align the membranes forming the compartments. As best seen in FIGS. 2 and 3, this construction provides the P solution inlet manifolding 36, to clamp only a membrane 9 between its first assembly 40 and the inner end of coupling 20, whereas the S solution inlet manifolding 37 clamps a membrane 9 and a membrane 10 between its first assembly 40, and the inner end of coupling 27. Thereafter the subsequent adjacent assemblies 40 of the manifolding arrangements 36 and 37, have clamped between them, a membrane 9 and a membrane 10, and the particular assemblies 40 at the very end of the respective manifolds, clamp membranes 9 and 10, and a single membrane 10, to the inner ends of couplings 26 and 28, respectively. Manifolding arrangements 39 and 38 providing outlet paths for the P and S solutions respectively, differ from their corresponding inlet manifolding arrangement for clamping the membranes in exactly the same way as the latter arrangements differ from one another.

A further significant advantage gained by the use of the assemblies 40 to index and align the compartments, is that the O-rings on the various coupling sets supporting the conduits, may be conveniently adjusted relative to the end plates 13 and 15, to apply separate clamping pressures to each row of the assemblies having the membranes between them. As a result, any leaks from around the edges of the holes in the membranes in which the conduits pass, may be stopped by merely applying more clamping pressure on the row of assemblies in which the leak occurred, without thereby placing any other row of assemblies under undue pressure that might tend to rupture the membranes.

A unit using single arrays of distributing assemblies to manifold every other compartment, is limited as to the practical maximum thickness for its compartments since any substantial reduction in such thickness would require that the assemblies also be made correspondingly thinner. It is difficult to produce disk components for extremely thin assemblies, which would be sufficiently strong and rigid to withstand the pressures to which they would normally be subjected. But thin compartments for a unit are advantageously obtained by using at least two separate manifolds for supplying the P solution, and at least two more for supplying the S solutions, with each having associated therewith a companion manifold to permit the solutions to leave the compartments. By this means every distributing assembly comprising the various manifolds services only one out of every four solution compartments contiguous thereto. As shown in FIG. 5, the construction hereinabove described may comprise a first conduit 48 to conduct diluting solution to a first input manifolding arrangement 49, through which the solution is entered in alternate even-numbered compartments such as the compartments 52 and 56, and a second conduit 50 to conduct the same sort of solution to a second input manifolding arrangement 51, through which the solution is entered in the intermediate even-numbered compartments such as compartment 54. It is therefore evident that the use of multiple manifoldings for handling the flow of each of the respective solutions in the unit, allows the compartments thereof to be made as thin as practicable, without sacrificing the strength and rigidity of the disk components of the distributing assemblies operatively associated with the compartments.

While preferred embodiments of the invention has been illustrated and described herein, it is to be understood that the invention is not limited thereby, but is susceptible to change in form and detail.

What is claimed is:

1. In a solution treatment apparatus having a multiplicity of generally parallel ion membranes defining compartmented, thin walled receptacles through which solution flows during treatment, interconnected relatively rigid wall forming elements including end walls retaining said receptacles in operative position between them, openings defined by surfaces in said end wall elements which are in axial alignment with apertures through said membranes, a solution distribution arrangement comprising solution input and output conduits passing through said openings and apertures, a plurality of adjustable coupling components retaining end portions of said conduits in said openings, a multiplicity of channeling elements supported on each said conduit whereby individual channeling elements of said multiplicity are separately supported within individual receptacles of said multiplicity, said channeling elements being disposed in said receptacles contiguous to said thin walls thereof, and each channeling element having wall means therein defining holes generally registering with said apertures and through which a conduit of said conduits is received, and longitudinal openings in said conduits communicating with passages in said channeling elements, said passages opening into said individual receptacles whereby a solution flowing between input and output conduits finds a path through the channeling elements and the receptacles.

2. The solution treatment apparatus of claim 1 wherein said end walls comprise enclosure plates between which the receptacles are supported in stacked alignment, and said end wall openings are located at corresponding positions in each of said enclosure plates, said coupling components being individually disposed at relatively widely spaced areas in said conduits and positioned within said openings whereby each pair of said individual coupling components separately maintains a conduit in the membrane apertures and positions a portion of said longitudinal opening thereof in said receptacles, and each said coupling component comprising a member mounted on said conduit and having a plurality of resilient means thereon constituting seals between said member and said conduit and said opening in said end wall wherein said member is received, respectively, while allowing each said coupling to be separately adjustable along said conduit whereon it is placed within said opening.

3. In the solution treatment apparatus of claim 2, said channeling elements of the distributing arrangement comprising surfaces in contact with said walls of the receptacles and encircling the said conduits, providing thereby passages through which a path for the solution in the conduits is completed from the portions of the longitudinal openings of the conduits, to the inside of the receptacles, and wherein said adjustment of the couplings along said conduits is adapted to impose a sealing pressure upon the said contact between the walls of the receptacles and the channeling elements.

4. The solution treatment apparatus of claim 1, wherein said solution distributing arrangement further comprises separate means to supply and withdraw the solutions in said receptacles, each said separate means including a plurality of said conduits, a diluting solution and concentrating solution are respectively received to flow through alternate contiguous receptacles, said solution distributing arrangement further comprising a first of said plurality of conduits to supply diluting solution in alternate receptacles, and a second of said plurality of conduits to supply concentrating solution in the receptacles contiguous to said alternate receptacles, and further first and second of said pluralities of conduits correspondingly associated to cooperate with said first and second pluralities of supply conduits, to withdraw from said receptacles the diluting and concentrating solutions respectively supplied thereto.

References Cited
UNITED STATES PATENTS

| | | | |
|---|---|---|---|
| 2,686,154 | 8/1954 | MacNeill | 210—321 |
| 2,689,826 | 9/1954 | Kollsman | 204—257 |
| 2,758,083 | 8/1956 | Van Hoek et al. | 204—301 |
| 2,980,598 | 4/1961 | Stoddard | 204—257 |
| 3,051,316 | 8/1962 | McNeill | 204—301 |
| 3,085,970 | 4/1963 | Davis | 204—301 |

FOREIGN PATENTS 73,924    1/1954    Holland.

JOHN H. MACK, *Primary Examiner.*

J. R. SPECK, *Examiner.*

G. BATTIST, R. MIHALEK, *Assistant Examiners.*